Patented Apr. 15, 1941

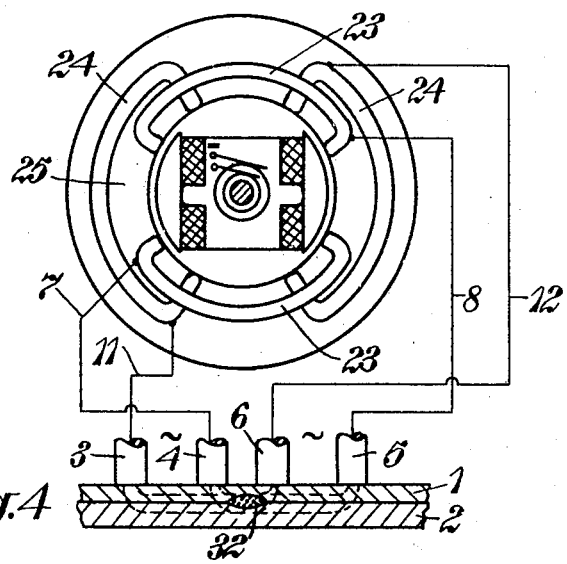
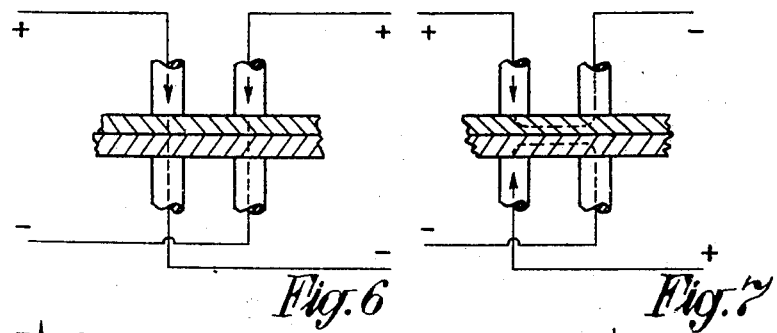
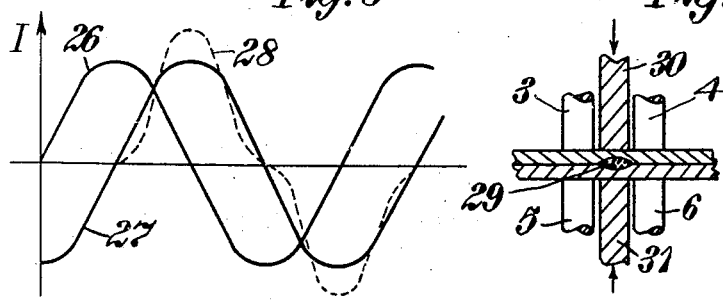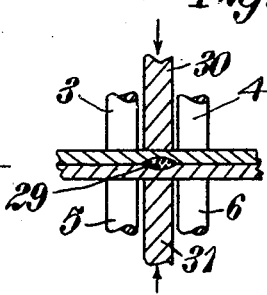

2,238,419

UNITED STATES PATENT OFFICE 2,238,419

ELECTRIC SPOT WELDING

Walter Hass, Klein-Machnow, near Berlin, Germany, assignor to Bernhard Berghaus, Berlin-Lankwitz, Germany Application September 28, 1938, Serial No. 232,196
In Germany October 9, 1937

5 Claims. (Cl. 219—4)

The present invention relates to electric resistance spot welding.

As is well known it is difficult in the case of electric resistance welding to relieve the contact surfaces of the electrodes which are subjected, especially in the case of light metal welding, to a very high current density of the heat due to the current, and thereby increase the quality of the surface of the material to be welded.

It has previously been proposed to cause two welding currents flowing along two different paths to cross one another at the same welding spot with the welding currents flowing simultaneously through the spot.

In contradistinction thereto the present invention relates to an arrangement wherein two or more welding currents are caused to flow through the same spot of the material to be welded, through a number of paths crossing one another at the spot, not simultaneously but in succession to one another periodically. By effecting the welding in this way the desired relief is obtained without the currents disturbing one another, as would be the case if currents of the same phase were used.

The invention also relates to apparatus for carrying out the method referred to and which is characterized by two separate electrodes on each side of the material to be welded, the four electrodes being crosswise associated and connected to the source of welding current in such paired association alternately or the welding currents supplied to one pair being displaced in phase relatively to the current supplied to the other pair. The apparatus for carrying out the method according to the invention may be constructed preferably for double spot welding by using four partial electrodes insulated from one another on the same side of the welding work, of which the first and the third on the one hand, and the second and the fourth on the other hand, receive current alternately, that is to say, they are fed with currents which are displaced in phase relatively to one another.

The invention is illustrated diagrammatically and by way of example in the accompanying drawings, in which:

Fig. 4 shows a two-phase generator for the generation of two currents for feeding the two circuits which cross one another, for instance, for welding from one side;

Fig. 5 shows the current curve when use is made of welding currents which are displaced in phase relatively to one another;

Figs. 6 and 7 show certain instantaneous conditions when use is made of currents displaced through 90° in phase; and Fig. 8 shows the arrangement of pressure pins between the partial electrodes.

Figure 1:
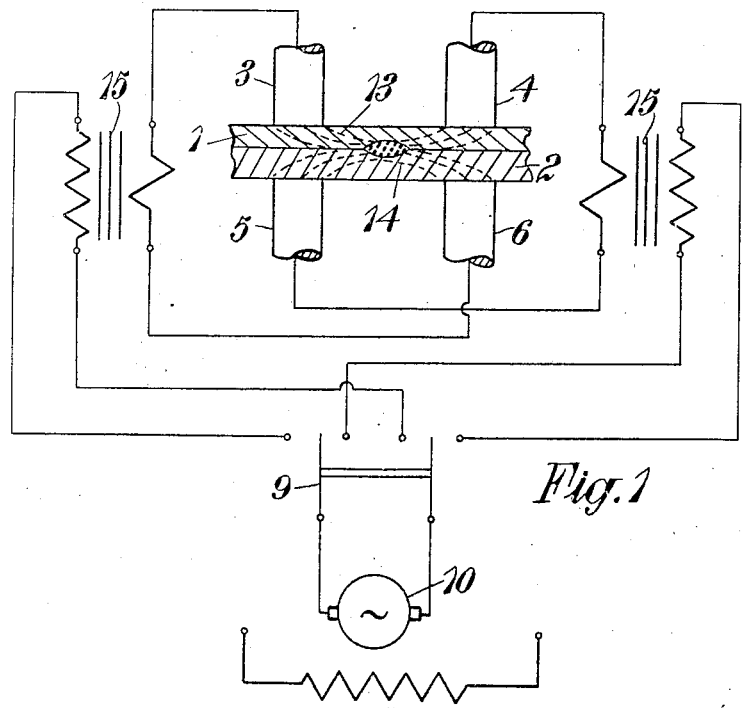
Fig. 1 is a part section through an apparatus for electrical single spot resistance welding with two partial electrodes on each one of the two sides of the material to be welded and a source of alternating current, which is alternately connected to the pairs of electrodes.

Referring to Fig. 1, which shows a partial section through apparatus for single spot electric resistance welding with two partial electrodes on each one of both sides of two metal sheets 1 and 2 to be welded together. On the upper metal sheet 1 there rests the two partial electrodes 3 and 4 which are insulated from one another and the lower metal sheet 2, is engaged by the two counter electrodes 5 and 6 which are insulated from one another. The two partial electrodes 3 and 6, as well as 4 and 5, may be connected alternately in quick succession to the source of current 10 over transformers 15 by means of a double pole switch 9. This change over switch may be constructed as an automatic oscillating switch. In this way there is produced in the material to be welded the welding currents 13 and 14 which follow quickly one after the other and the paths of which cross one another in the welding spot.

Figure 2:
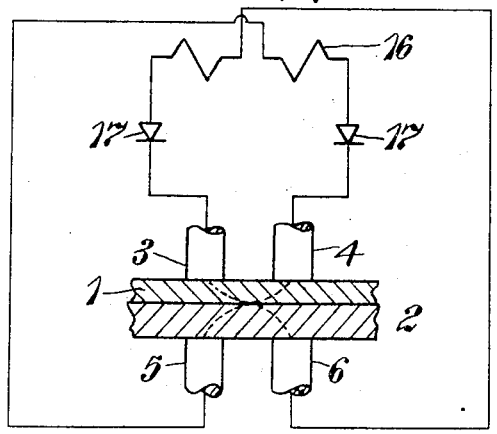
Figs. 2 and 3 show a similar arrangement with rectifiers and tubes respectively.

Referring to Fig. 2, instead of the mechanical switch 9, use may be made of rectifiers known per se, for instance, provided with grid control. If the current in the electric circuits which cross one another is controlled by rectifiers in such a manner that it flows in the circuits alternately with sufficiently high frequency, for instance 50 cycles per second or more, then the current paths are formed entirely independently of one another. In this way double the amount of heat is released in the crossing zone during a welding time exceeding one cycle, as compared with the zone of the current path outside the crossing point. The material to be welded lying outside the welding spot and the electrodes are consequently correspondingly less loaded. The method according to the invention thus enables the zone of influence to be reduced transversely to the metal sheet, the life of the electrodes to be increased and the quality of the surface of the welded material to be improved. When use is made of control by means of rectifiers, the number of the partial electrodes may be increased as desired, while retaining the advantageous heat distribution of the arrangement according to Fig. 1. An exemplary rectifier control arrangement is shown in Fig. 2 wherein the transformer is provided with two secondary windings 16. Each of the secondary windings is connected in series circuit relation with respect to a rectifier 17 and a pair of electrodes 3 and 6 or 4 and 5.

Figure 3:
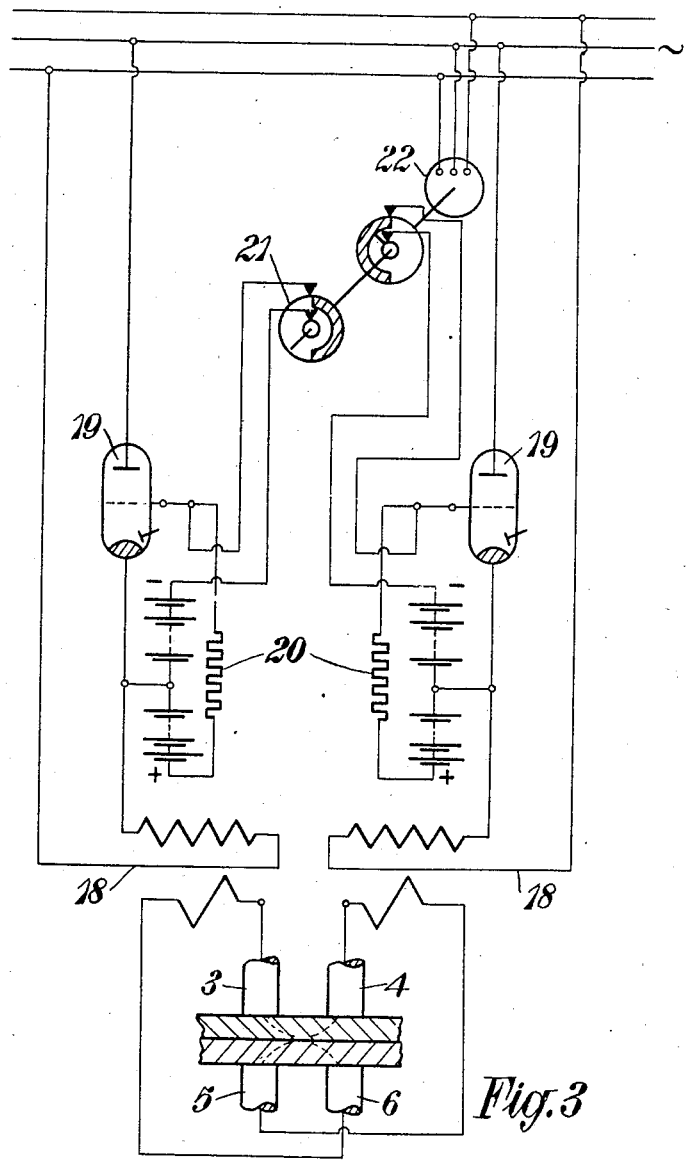

A further arrangement in which tube switches are used is illustrated in Fig. 3. 18 are the two welding transformers, the secondary windings of which are each connected to a pair of electrodes 3 and 6 or 4 and 5. 19 are the electric discharge tubes, each provided with a grid control arrangement 20, which is, for instance, actuated by a rotating contact maker 21, the drive of which is effected by a motor 22. The two pairs of electrodes are alternately in operation, corresponding to the time of half a revolution of the contact maker.

Fig. 4 shows a two-phase generator for the generation of two currents displaced in phase for the feeding two circuits which cross one another, this generator being used instead of the single phase alternating current machine 10 of Fig. 1. Preferably use is made of two-phase current with a displacement of 90°. 7 and 8 are the connecting leads for the one and 11 and 12 are the connecting leads for the other current phase. 23 are the windings of the one phase and 24 those of the other phase. 25 is the rotor.

The curves 26 and 27 of Fig. 5 indicate the two currents which are displaced in phase by 90°. The favourable heat distribution in the material to be welded takes place mainly, when one of the two currents passes through zero. However, at the moment when the currents are of equal value in the same direction or in opposite directions, an undesired current distribution is produced, as is shown in Figs. 6 and 7. In that case, however, the current has dropped to the value of $\frac{1}{2}\sqrt{2}$ the maximum value. The heat which is then released per unit of volume of the welding work underneath the electrodes reaches only half the maximum value at the crossing point. The ideal heat distribution according to Fig. 1 is therefore obtained to a large extent. It is advantageous further to reduce the intensity of current in the time period illustrated in Figs. 6 and 7, and this may be attained by suitable distortion of the current curves. Such a current curve is shown at 28, which represents a fundamental wave distorted by a third harmonic, such as may for instance be obtained by using a parallel air gap in the two phase generator.

Fig. 8 shows how the arrangement of the partial electrodes laterally with respect to the welding spot 29 permits pressing pins 30 and 31 to be used between the partial electrodes 3 and 4 and 5 and 6. This arrangement separates the current supply zone from the pressure zone, and has the advantage that the pin can engage in the very zone of the material to be welded which has not been reached by the heat released from the contact surface of the electrodes, that is to say, it allows a higher pressure to be used, which exerts a favourable action as regards a fine crystalline structure of the welding spot.

As is shown in Fig. 4 the method has the advantages described in the case of welding apparatus in which all the partial electrodes lie only on one side of the two metal sheets 1 and 2. 32 is the welding spot which has been produced. The electric connection of the partial electrodes which are connected to a two-phase generator, may be effected, as has been described in connection with Figs. 1 to 3. The currents proceeding between the electrodes 3 and 6 and between 4 and 5 cross one another at the welding spot 32. The contact surfaces 3 and 5 are made larger than that of the middle electrodes 4 and 6, so that only one welding spot is produced in the middle under the bipartite middle electrode. The same advantageous heat distribution is then obtained as has been described in connection with the single spot welding, and the welding spot 32 is produced at the crossing point of the current paths. A pressure pin may advantageously be used in the middle. The middle partial electrodes or the pressure pin or both are preferably so constructed, that they contribute effectively by cooling to the reduction in the temperature increase at the current carrying inner edge of the middle electrode. In this way the advantages referred to in connection with the single spot welding according to Figure 1 may also be obtained by using the arrangement described to effect reliable weldings in the case of light metals, that is to say in which the surface will not be damaged and the welding spot will be well formed. The arrangement described is also suitable for materials the oxide layer of which shows an appreciable conductivity in the cold state, such as copper and steel, in which a decomposition of the oxides sufficiently below the welding temperature, as in the case of iron, takes place with special advantage.

What I claim is:

1. Apparatus for electric resistance spot welding comprising, four electrodes adapted to be placed on one face of the material to be welded, a two phase generator, and means for connecting the first and the third and the second and the fourth electrode to the respective two phases of the two phase generator whereby welding currents displaced in phase will be caused to flow in succession of one another periodically through the same spot of the material being welded through two paths crossing one another at said spot.

2. Apparatus for electric resistance spot welding comprising in combination, a first electrode and a second electrode spaced from the first electrode both engaging one face of the material to be welded, a third electrode and a fourth electrode spaced from the third electrode both engaging the opposite face of the material to be welded, a two-phase generator, means connecting the first and the fourth electrodes to one phase of said generator, and means connecting the second and the third electrodes to the other phase of the generator, whereby currents displaced in phase will be caused to flow in succession of one another periodically through the same spot of the material to be welded through two paths crossing one another at said spot.

3. Apparatus for electric resistance spot welding comprising in combination, a first electrode and a second electrode spaced from the first electrode both engaging one face of the material to be welded, a third electrode and a fourth electrode spaced from the third electrode both engaging the opposite face of the material to be welded, an electrical source, means for successively impressing a voltage from said source across the first and the fourth electrodes and across the second and the third electrodes whereby welding currents will be caused to flow in succession of one another periodically through the same spot of the material being welded through two paths crossing one another at said spot.

4. Apparatus for electric resistance spot welding comprising in combination, a first electrode and a second electrode spaced from the first electrode both engaging one face of the material to be welded, a third electrode and a fourth electrode spaced from the third electrode both engaging the opposite face of the material to be welded, a welding transformer having two secondary windings, a circuit connecting one secondary winding across the first and fourth electrodes, a rectifier in said circuit, a second circuit connecting the other secondary winding across the second and third electrodes, and a rectifier in the second circuit.

5. Apparatus for electric resistance spot welding comprising in combination, a first electrode and a second electrode spaced from the first electrode both engaging one face of the material to be welded, a third electrode and a fourth electrode spaced from the third electrode both engaging the opposite face of the material to be welded, an electrical source, a welding transformer having a secondary connected across the first and the fourth electrodes, another welding transformer having a secondary connected across the second and the third electrodes, primary windings for said welding transformers, and a double pole throw switch for momentarily connecting said source to one of said primary windings and thereafter to the other primary winding whereby welding currents will flow in succession of one another periodically through the same spot of the material being welded through two paths crossing one another at said spot

WALTER HASS.